(12) United States Patent
Edmundson et al.

(10) Patent No.: US 6,569,225 B2
(45) Date of Patent: May 27, 2003

(54) BREATHABLE BARRIER FILMS CONTAINING CAVATED FILLERS

(75) Inventors: Charles Edward Edmundson, Roswell; Bryon Paul Day, Canton, both of GA (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 4 days.

(21) Appl. No.: 09/732,258

(22) Filed: Dec. 7, 2000

(65) Prior Publication Data

US 2002/0107295 A1 Aug. 8, 2002

(51) Int. Cl.[7] .................. B01D 53/02; B01D 53/22; B01D 39/00; B29B 5/18
(52) U.S. Cl. .............. 95/52; 96/4; 96/10; 210/500.27; 210/500.35; 210/500.36; 210/500.38; 210/500.42; 521/54; 523/218; 442/370; 442/375
(58) Field of Search .................. 442/370, 375; 95/52; 96/4, 10; 523/218; 210/500.27, 500.35, 500.36, 500.38, 500.42; 521/54

(56) References Cited

U.S. PATENT DOCUMENTS

| | | | |
|---|---|---|---|
| 3,338,992 A | 8/1967 | Kinney | 264/24 |
| 3,341,394 A | 9/1967 | Kinney | 161/72 |
| 3,502,538 A | 3/1970 | Petersen | 161/150 |
| 3,502,763 A | 3/1970 | Hartman | 264/210 |
| 3,542,615 A | 11/1970 | Dobo et al. | 156/181 |
| 3,692,618 A | 9/1972 | Dorschner et al. | 161/72 |
| 3,802,817 A | 4/1974 | Matsuki et al. | 425/66 |
| 3,849,241 A | 11/1974 | Butin et al. | 161/169 |
| 4,340,563 A | 7/1982 | Appel et al. | 264/518 |
| 4,636,343 A | 1/1987 | Shibanai | 264/118 |
| 5,001,176 A | 3/1991 | Nakazima | 524/48 |
| 5,032,450 A * | 7/1991 | Rechlicz et al. | 428/196 |
| 5,272,236 A | 12/1993 | Lai et al. | 526/348.5 |
| 5,322,728 A | 6/1994 | Davey et al. | 428/296 |
| 5,492,947 A | 2/1996 | Wood et al. | 524/48 |
| 5,505,969 A | 4/1996 | Wood et al. | 426/130 |
| 5,571,619 A | 11/1996 | McAlpin et al. | 428/364 |
| 5,603,974 A | 2/1997 | Wood et al. | 426/415 |

FOREIGN PATENT DOCUMENTS

| | | | |
|---|---|---|---|
| EP | 0 514 578 B1 | 5/1996 | B65D/81/28 |
| JP | 04 359028 | 12/1992 | C08J/5/18 |
| JP | 11 116701 | 4/1999 | C08J/5/18 |
| WO | 99/14262 | 3/1999 | C08J/5/18 |
| WO | 01/15898 | 3/2001 | B32B/27/32 |
| WO | 01/58685 | 8/2001 | B32B/27/20 |

OTHER PUBLICATIONS

Nippo Co., Ltd.: Abstract Only, JP 1–149,884 A.
FP Corp.; Sekisui Plastics Co., Ltd.: Abstract Only, JP 6–153,779 A.
Hidaka Kagaku KK et al.: Abstract Only, JP 10–245,403 A.
Kuraray Co., Ltd.: Abstract Only, JP 11–116,756 A.

* cited by examiner

*Primary Examiner*—Morton Foelak
(74) *Attorney, Agent, or Firm*—Pauley Petersen Kinne & Erickson

(57) ABSTRACT

A breathable, stretch-thinned barrier film having improved strength, processability and/or breathability is formed from a mixture of a thermoplastic polymer and cavated filler particles such as cyclodextrin. The cavated filler particles provide the film with enhanced breathability to water vapor due to their ring-like, conical, cylindrical or otherwise hollow molecular structure, yet the film remains substantially impermeable to aqueous liquids. The enhanced breathability occasioned by the cavated particles permits the use of relatively low filler levels and correspondingly high polymer levels, thereby enhancing the film strength. The filler may melt during extrusion of the molten polymer into a film, facilitating smooth processing, and re-crystallize into particles after the film is formed and cooled.

33 Claims, 3 Drawing Sheets

BREATHABLE BARRIER FILMS CONTAINING CAVATED FILLERS

FIELD OF THE INVENTION

This invention is directed to a breathable, stretch-thinned barrier film which uses a cavated filler for improved moisture vapor breathability at lower filler levels. The invention is also directed to breathable nonwoven fabric laminates containing the film.

BACKGROUND OF THE INVENTION

Breathable, stretch-thinned films and nonwoven fabric laminates containing them are known in the art. The films are typically prepared by mixing a polyolefin, for example polyethylene or polypropylene, with a particulate inorganic filler, for example calcium carbonate. The mixture is cast or blown into a film. The film may have a single filler-containing layer, or may be coextruded with one or two outer skin layers for improved processing and later bonding to a substrate.

The films are rendered breathable to water vapor by stretching them uniaxially or biaxially, to 1.5–7.0 times their original dimension in one or both directions, at an elevated temperature which is below the melting point of the polyolefin. The stretching causes localized separation between the polyolefin and individual filler particles, resulting in void formation around the filler particles. The voids are bounded by thin polymer membranes, which may be continuous or broken between adjacent voids. The network of voids and thin polymer membranes creates a tortuous path through the film, through which water vapor may diffuse. However, the film remains substantially impermeable to liquid water.

The particulate inorganic filler, commonly calcium carbonate, is solid and much denser than the polyolefin in the film. Because the particles are solid, water vapor does not pass through them, but instead must pass around them within the voids. Thus, the filler particles themselves do not contribute to breathability, other than to facilitate the formation of voids. The relative impermeability of the particles, coupled with their high density, means that the loading of filler required to produce an effective breathable film is quite high on a weight percentage basis. When the filler is calcium carbonate, loadings of 45–70% by weight of the film, typically 50–60% by weight of the film, are common for films having desired levels of high water vapor breathability.

One drawback of high filler levels is that the correspondingly low level of polymer weakens the structural integrity of the films, rendering the films susceptible to puncture, rupture and tear. Only the polymer, and not the filler, contributes to the structural integrity of the films. Until now, the relative weakness of stretch-thinned breathable films has been overcome by laminating the films on one or both sides to a nonwoven web, such as a spunbond web. A polypropylene spunbond web, for instance, can serve as an effective load bearing constituent in a wide variety of personal care absorbent garments and medical apparel for which the breathable barrier laminates are employed. Another drawback of high filler levels has been build-up at the die lips during film extrusion.

There remains a need or desire for breathable, stretch-thinned films which provide high levels of breathability at lower filler (and correspondingly higher) polymer levels, and thus have improved strength.

SUMMARY OF THE INVENTION

The present invention is directed to a breathable, stretch-thinned film made from a mixture of a thermoplastic polymer and a cavated filler, and a nonwoven fabric laminate containing the film. The term "cavated filler" includes filler particles which have hollow or cavity-containing molecular structures, i.e., molecular structures which are naturally hollow or contain cavities due to their chemistry. In one embodiment, stretch-thinned films of moderate to high breathability and high strength are formed from a blend of about 55–95% by weight thermoplastic polymer and about 5–45% by weight of a cavated filler. In another embodiment, stretch-thinned films of very high breathability and conventional strength are formed from a blend of about 20% to less than 55% by weight thermoplastic polymer and greater than 45% to about 70% by weight cavated filler particles. Particularly suitable cavated filler particles include cyclodextrins and molecules containing cyclodextrins.

Filler particles formed from cavity-containing molecules are believed to enhance the breathability of films because the particles themselves exhibit some moisture vapor transmission and, thus, contribute to the overall breathability of the film. Put another way, moisture vapor can pass through the filler particles as well as around the particles. Additionally, cavated filler particles generally have lower densities than solid filler particles formed of non-cavated inorganic structures. The increased water vapor transmission and lower density of the cavated filler particles allow the formation of breathable, stretch-thinned films having suitable water vapor transmission at lower filler loadings, based on weight percentage of the films. Alternatively, stretch-thinned films of exceptional breathability can be produced using higher loadings of cavated filler particles which are comparable to the loadings of conventional inorganic filler particles in conventional stretch-thinned films.

The breathable, stretch-thinned films of the invention may be used alone or in combination with one or more nonwoven webs in a wide variety of personal care absorbent garments and medical apparel. The increased film strength resulting from lower filler loadings may permit the stretch-thinned films to be used alone, without a separate load bearing constituent, in certain applications. Alternatively, the films may be combined with one or more nonwoven webs to provide breathable barrier laminates of improved structural integrity and/or breathability.

With the foregoing in mind, it is a feature and advantage of the invention to provide a breathable, stretch-thinned barrier film having improved strength and/or breathability, formed from a mixture of a thermoplastic polymer and a cavated particulate filler.

It is also a feature and advantage of the invention to provide a variety of breathable nonwoven fabric laminates which incorporate the breathable, stretch-thinned film made using a cavated filler.

It is also a feature and advantage of the invention to provide personal care absorbent garments and medical apparel which incorporate the films and laminates of the invention and exhibit improved durability and/or breathability.

DEFINITIONS

Figure 1:
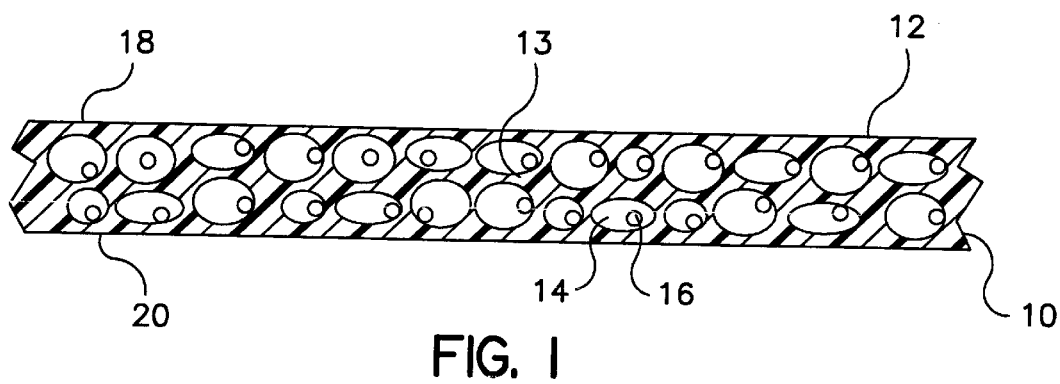
FIG. 1 is a sectional view of a single-layer stretch-thinned breathable film of the invention.

The term "film" refers to a thermoplastic film made using a film extrusion process, such as a cast film or blown film extrusion process.

The term "breathable barrier film" refers to a film which is substantially impermeable to liquid water and has a water vapor transmission rate ("WVTR") of at least about 1000 grams/m$^2$-24 hours using the Mocon procedure described below.

The term "cavated filler particle" or "cavated filler material" refers to filler particles which are made from cavity-containing or hollow molecules, i.e., molecules which are hollow or contain cavities due to their chemical structure. The term is not intended to include particles such as glass beads which are hollow in a macroscopic sense due to their manufacturing process.

The term "polymer" includes, but is not limited to, homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to isotactic, syndiotactic and atactic symmetries.

The term "nonwoven fabric or web" means a web having a structure of individual fibers or threads which are interlaid, but not in a regular or identifiable manner as in a knitted fabric. Nonwoven fabrics or webs have been formed from many processes such as, for example, meltblowing processes, spunbonding processes, air laying processes, and bonded carded web processes. The basis weight of nonwoven fabrics is usually expressed in ounces of material per square yard (osy) or grams per square meter (gsm) and the fiber diameters are usually expressed in microns. (Note that to convert from osy to gsm, multiply osy by 33.91.)

The term "microfibers" means small diameter fibers having an average diameter not greater than about 75 microns, for example, having an average diameter of from about 1 micron to about 50 microns, or more particularly, microfibers may have an average diameter of from about 1 micron to about 30 microns. Another frequently used expression of fiber diameter is denier, which is defined as grams per 9000 meters of a fiber. For a fiber having circular cross-section, denier may be calculated as fiber diameter in microns squared, multiplied by the density in grams/cc, multiplied by 0.00707. A lower denier indicates a finer fiber and a higher denier indicates a thicker or heavier fiber. For example, the diameter of a polypropylene fiber given as 15 microns may be converted to denier by squaring, multiplying the result by 0.89 g/cc and multiplying by 0.00707. Thus, a 15 micron polypropylene fiber has a denier of about 1.42 (152×0.89× 0.00707=1.415). Outside the United States the unit of measurement is more commonly the "tex," which is defined as the grams per kilometer of fiber. Tex may be calculated as denier/9.

The term "spunbonded fibers" refers to small diameter fibers which are formed by extruding molten thermoplastic material as filaments from a plurality of fine capillaries of a spinnerette having a circular or other configuration, with the diameter of the extruded filaments then being rapidly reduced as by, for example, in U.S. Pat. No. 4,340,563 to Appel et al., U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,502,538 to Petersen, and U.S. Pat. No. 3,542,615 to Dobo et al., each of which is incorporated herein in its entirety by reference. Spunbond fibers are quenched and generally not tacky when they are deposited onto a collecting surface. Spunbond fibers are generally continuous and often have average diameters larger than 7 microns, more particularly, between about 10 and 30 microns.

The term "meltblown fibers" means fibers formed by extruding a molten thermoplastic material through a plurality of fine, usually circular, die capillaries as molten threads or filaments into converging high velocity heated gas (e.g., air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed for example, in U.S. Pat. No. 3,849,241 to Butin et al. Meltblown fibers are microfibers which may be continuous or discontinuous, are generally smaller than 10 microns in diameter, and are generally self bonding when deposited onto a collecting surface. Meltblown fibers used in the invention are preferably substantially continuous in length.

DETAILED DESCRIPTION OF THE PRESENTLY PREFERRED EMBODIMENTS

Referring to FIG. 1, a breathable monolayer film 10 is shown including a matrix 12, a plurality of voids 14 within the matrix surrounded by relatively thin microporous membranes 13 defining tortuous paths, and one or more filler particles 16 in each void 14. The film 10 is microporous as well as breathable, and the microporous membranes 13 between the voids readily permit molecular diffusion of water vapor from a first surface 18 to a second surface 20 of the film 10.

The matrix 12 can include any suitable film-forming matrix polymer. Examples of suitable matrix polymers include without limitation polyethylene, polypropylene, copolymers of mainly ethylene and $C_3$–$C_{12}$ alpha-olefins (commonly known as linear low density polyethylene), copolymers of mainly propylene with ethylene and/or $C_4$–$C_{12}$ alpha-olefins, and flexible polyolefins including propylene-based polymers having both atactic and isotactic propylene groups in the main polypropylene chain. Other suitable matrix polymers include without limitation elastomers, for example polyurethanes, copolyether esters, polyamide polyether block copolymers, ethylene methyl acrylate, ethylene ethyl acrylate, and ethylene vinyl acetate copolymers, and combinations of the foregoing. Metallocene-catalyzed polyolefins are useful, including those described in U.S. Pat. Nos. 5,571,619, 5,322,728, and 5,272,236, the disclosures of which are incorporated herein by reference.

Polymers made using metallocene catalysts have a very narrow molecular weight range. Polydispersity numbers (Mw/Mn) of below 4 and even below 2 are possible for metallocene-produced polymers. These polymers also have a controlled short chain branching distribution compared to otherwise similar Ziegler-Natta produced type polymers. It is also possible using a metallocene catalyst system to control the isotacticity of the polymer quite closely.

Commercial production of single-site catalyzed polymers is somewhat limited but growing. Such polymers are available from Exxon Chemical Company of Baytown, Tex. under the trade name ACHIEVE® for polypropylene based polymers and EXACT® and EXCEED® for polyethylene based polymers. Dow Chemical Company of Midland, Mich. has polymers commercially available under the name ENGAGE®. These materials are believed to be produced using non-stereo selective metallocene catalysts. Exxon generally refers to their metallocene catalyst technology as "single site" catalysts while Dow refers to theirs as "constrained geometry" catalysts under the name INSIGHT® to distinguish them from traditional Ziegler-Natta catalysts which have multiple reaction sites. Other manufacturers such as Fina Oil, BASF, Amoco, Hoechst and Mobil are active in this area and it is believed that the availability of polymers produced according to this technology will grow substantially in the next decade. In the practice of the instant invention, elastic polyolefins like polypropylene and polyethylene are preferred.

The matrix polymer may constitute about 30–95% by weight of the breathable monolayer film 10 (or, in the case of multilayer films described below, that percent of the filled film layer). When the film (after stretching, as described below) is desired to have excellent strength and moderate to high breathability, the matrix polymer may constitute about 55–95% by weight of the breathable film or film layer, suitably about 60–80% by weight of the breathable film or film layer. In this embodiment, the filler particles 16 may constitute about 5–45% of the breathable film or film layer, suitably about 20–40% by weight. When the film (after stretching) is desired to have superior breathability and moderate strength, the breathable film or film layer may include about 30% to less than 55% by weight of the matrix polymer, suitably about 35–50% by weight; and more than 45% to about 70% by weight of the particulate filler, suitably about 50–65% by weight.

In accordance with the invention, the filler particles 16 are cavated filler particles whose molecules have a hollow or cavity-containing molecular structure. For instance, the molecular structure may be conical, cylindrical, ring-like, or any molecular structure having a central opening or passage. Suitable cavated filler particles include cyclodextrins. Subject to the limitations below affecting utility, the term "cyclodextrins" includes cyclodextrin compounds and their derivatives which retain the cyclodextrin ring-like structure in all or part of their molecular configurations.

Cyclodextrins may contain from six to twelve glucose units arranged in a ring. Cyclodextrins include, for instance, alpha-cyclodextrin compounds (6 glucose units arranged in a ring), beta-cyclodextrin compounds (7 glucose units arranged in a ring) and gamma-cyclodextrin compounds (8 glucose units arranged in a ring). The coupling and configuration of the glucose units causes the cyclodextrins to have a conical molecular structure with a hollow interior lined by hydrogen atoms and glycoside bridging oxygen atoms.

Suitable cyclodextrin compounds should be in a chemical form which permits them to exist as solid particles having a melting point higher than the desired stretching temperature for the thermoplastic polymer employed in the film yet lower than the film extrusion temperature. This way, the film can be extruded with the polymer and filler in a molten state, and later stretched somewhat below the melting point of the polymer, without melting the cyclodextrin particles. By melting the cavated filler during extrusion, processing problems such as die lip build-up are alleviated. Yet to perform its void-initiating function during film stretching, the filler must re-crystallize and remain in a solid particulate state during film stretching.

Thus, for purposes of the invention, the term "cyclodextrins" includes cyclodextrin compounds and their derivatives which a) retain the cyclodextrin ring structure, b) exist in a solid particulate form at the stretching temperature of the film (which is below the melting point of the polymer), and c) preferably melt below the extrusion temperature of the film (which is above the melting point of the polymer). If the filler particles liquefy and flow, or significantly deform during heating and stretching of the film, the particles may not sufficiently pull away from the matrix polymer to allow void formation as needed to render the film 10 breathable to water vapor. Thus, the proper selection of the filler material may depend partly on the matrix polymer and the temperature required to stretch the matrix 12.

The cavated filler material should also be sufficiently incompatible with the matrix polymer so that the filler material exists as stable particles in thermodynamic equilibrium within the polymer matrix. In other words, the filler material should be sufficiently incompatible with the matrix polymer to discourage or prevent dissolution or excessive dispersion of the filler particles in the matrix polymer. For purposes of the invention, the cavated filler particles 16 should have a steady state mean particle diameter of about 0.1–25 microns, preferably about 0.5–10 microns, most preferably about 0.8–3 microns. "Steady state mean particle diameter" means that the filler particles achieve thermodynamic equilibrium in the matrix within that size range. While some agglomeration, dispersion or dissolution of the particles may occur, especially when the matrix polymer is molten, these factors offset each other to maintain a mean particle diameter within the stated ranges. If the filler particles dissolve in the polymer matrix, or break down and disperse to the point of becoming too small, they may not be effective in causing void formation during stretching of the film 10. In various embodiments, the filler particles 16 may include a mixture of different filler particles (e.g., made from different materials).

The film may be uniaxially or biaxially stretched. The film may be uniaxially stretched to about 1.1–7.0 times its original length, preferably to about 1.5–6.0 times its original length, most preferably to about 2.5–5.0 times its original length. The film may alternatively be biaxially stretched by the same ratios, using conventional techniques familiar to persons skilled in the art. The stretching should occur below the melting temperature of the polymer matrix, suitably about 15–50° F. below the melting point of the polymer matrix.

The breathable, stretch-thinned film 10 should have a thickness which facilitates breathability to water vapor, and which also provides structural integrity and liquid barrier. After stretching, the film 10 should have a thickness of about 5–50 microns, preferably about 8–30 microns, most preferably about 10–20 microns. Prior to the orientation, the film 10 can be prepared using cast or blown film extrusion, or another suitable film-forming technique.

Figure 2:
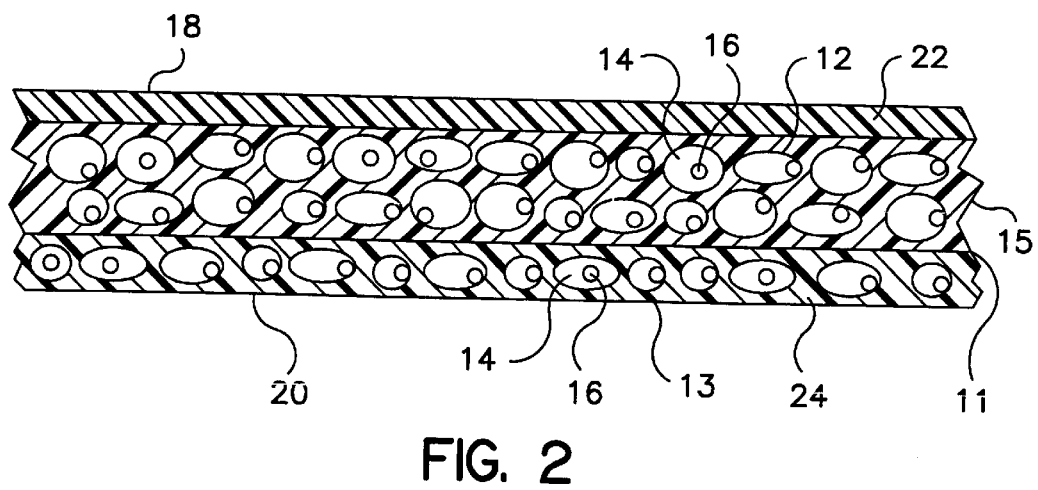
FIG. 2 is a sectional view of a multilayer breathable film of the invention.

FIG. 2 illustrates another embodiment in which a multilayer stretch-thinned breathable film 11 includes a primary breathable core layer 15 coextruded between two outer skin layers 22 and 24. The core layer 15 includes polymer matrix to 12, and cavated filler particles 16 surrounded by voids 14. The first outer skin layer 22 includes only a thermoplastic polymer, and is free of filler particles and voids. The second outer skin layer 24 includes a polymer matrix 13, and filler particles 16 surrounded by voids 14 within the matrix 13.

The multilayer film 11 in FIG. 2 illustrates that the outer skin layers 22 and 24 may or may not contain a filler. The core layer 15 may have the same or a similar composition to the monolayer film 10 described with respect to FIG. 1. The outer layers 22 and 24 generally contain a softer, lower melting polymer or polymer blend which renders the outer layers suitable as heat seal bonding layers for thermally bonding the film to a nonwoven web. When the outer layer (e.g., 22) is free of filler, one objective is to alleviate the build-up of filler at the extrusion die lip which may otherwise result from extrusion of a filled monolayer film. When the outer layer (e.g., 24) contains filler particles and voids, one objective is to provide a suitable bonding layer without adversely affecting the overall breathability of the film 11.

The thickness and composition of the outer layers 22 and 24 should be selected so as not to substantially impair the moisture transmission through the breathable core layer 15. This way, the breathable core layer 15 may determine the breathability of the entire film, and the outer layers will not substantially reduce or block the breathability of the film. To this end, the skin layers 22 and 24 should be less than about 10 microns thick, suitably less than about 5 microns thick, desirably less than about 2.5 microns thick. Suitable skin layer polymers include without limitation ethylene vinyl acetates, propylene vinyl acetates, ethylene methyl acrylates, other vapor-permeable polymers, and blends of these with other polyolefins.

Regardless of whether the breathable stretch-thinned film is a monolayer film or a multilayer film, the overall film should be constructed to function as a breathable microporous film. To function properly, the overall film should have a water vapor transmission rate (WVTR) of at least about 1000 grams/m$^2$-24 hours measured using the Mocon procedure described below. Suitably, the overall film should have an WVTR of at least about 1500 grams/m$^2$-24 hours, more suitably at least 2000 grams/m$^2$-24 hours, desirably at least 5000 grams/m-24 hours, more desirably at least 10,000 grams/m$^2$-24 hours, even more desirably at least 15,000 grams/m$^2$-24 hours, and preferably at least 20,000 grams/m$^2$-24 hours.

Figure 3:
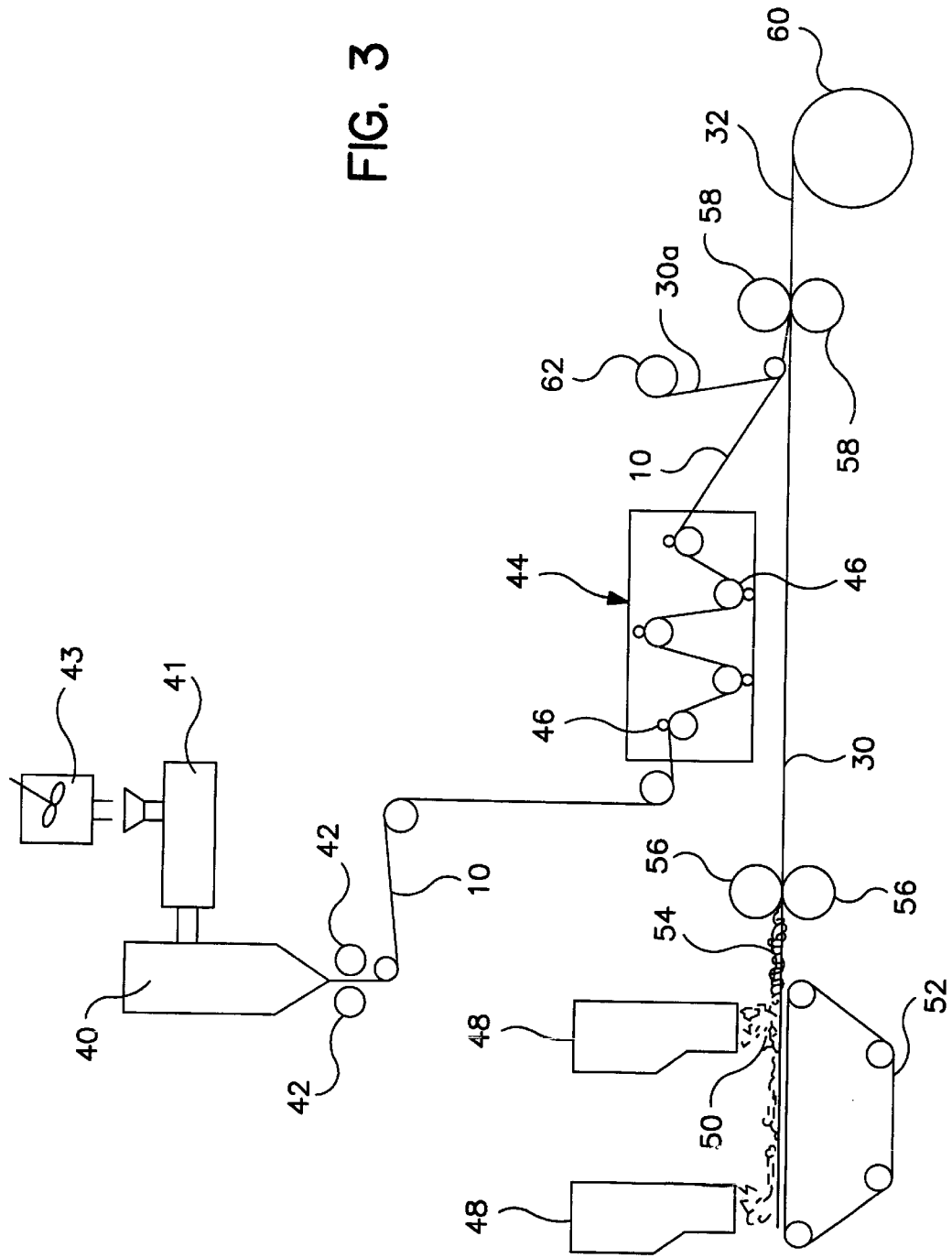
FIG. 3 schematically illustrates a process for laminating a breathable film of the invention to a nonwoven web.

FIG. 3 illustrates an integrated process for forming a breathable microporous film and a film/nonwoven laminate containing it. Referring to FIG. 3, film 10 is formed from a film extrusion apparatus 40 such as a cast or blown unit which could be in-line or off-line. Typically the apparatus 40 will include an extruder 41. Filled resin, including the polymer matrix material, and cavated filler, is prepared in a mixer 43 and directed to extruder 41. The film 10 is extruded into a pair of nip or chill rollers 42, one of which may be patterned so as to impart an embossed pattern to the newly formed film 10.

From the film extrusion apparatus 40 or off-line rolls supplied, the filled film 10 is directed to a film stretching unit 44 which can be a machine direction orienter, commercially available from vendors including the Marshall and Williams Co. of Providence, R.I. Apparatus 44 has a plurality of pairs of stretching rollers 46, with each subsequent pair moving at progressively faster speed than the preceding pair. The rollers 46 apply an amount of stress and progressively stretch the filled film 10 to a stretched length where the film 10 becomes microporous and breathable. As shown, the film 10 is stretched only in the machine direction, which is the direction of travel of the film 10 through the process in FIG. 3.

Advantageously, the film 10 may be uniaxially stretched to about three times its original length, using an elevated stretch temperature of about 150–200° F. for most polyolefin-based films. The elevated stretch temperature can be sustained by heating some of the stretch rollers 46. The optimum stretch temperature varies with the type of matrix polymer in the film 10, and is always below the melting temperature of the matrix polymer. The film 10 may also be biaxially stretched, with the cross-directional stretching occurring before, after or concurrently with the machine direction stretching.

Still referring to FIG. 3, the film 10 may be laminated to nonwoven web 30 immediately after the film is stretched and immediately following manufacture of the nonwoven web. The nonwoven web 30 can be a spunbonded web, a meltblown web, a bonded carded web, or combination thereof. The web can be formed by dispensing polymer filaments 50 from a pair of conventional spinnerettes 48, onto a conveyor assembly 52. The filaments 50 are deposited onto the conveyor to form mat 54. The filaments 50 of mat 54 are then compressed to form inter-filament bonding using a pair of nip rollers 56, resulting in the spunbonded web 30. The spunbonded web 30 is then transported to the calender bonding rollers 58 and is thermally bonded to one side of the film 10. The film 10 in FIG. 3 is simultaneously bonded on its other side to a second material 30a originating from a supply roll 62. The second material 30a may be a second nonwoven web, or another film layer. The resulting laminate 32 is wound and stored onto a supply roll 60.

Figure 4:
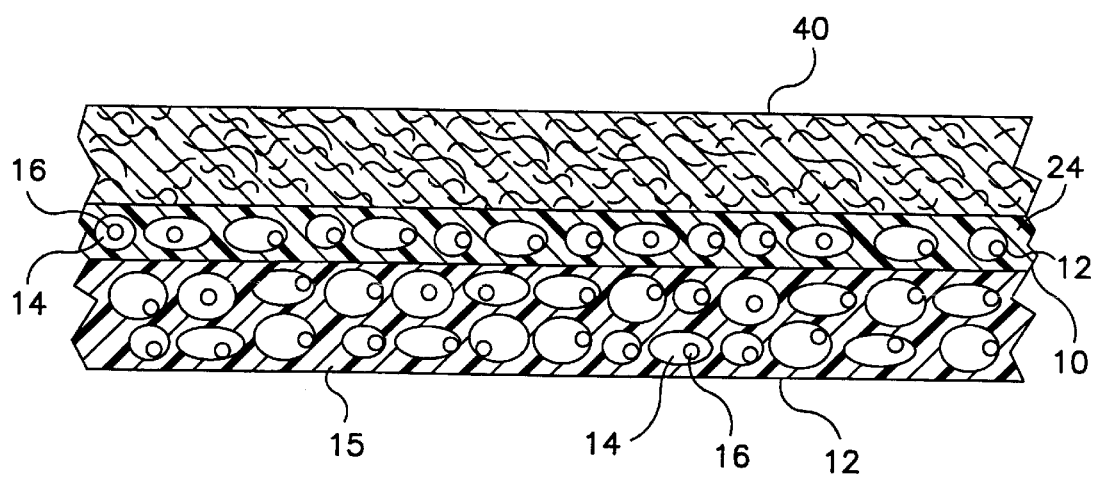
FIG. 4 illustrates a laminate including the breathable film of the invention.

The breathable film may be laminated to one or more nonwoven substrates, such as a spunbond or meltblown web, using conventional adhesive bonding or thermal bonding techniques known in the art. The type of substrate and bonding will vary depending on the particular end use application. An example of a laminate is shown in FIG. 4, wherein a nonwoven web 40 is laminated to a two-layer breathable film of the invention. In the embodiment shown, the web 40, which can be a spunbonded web of polypropylene or polyethylene, is bonded to a voided skin layer 24 of the multilayer film 10, which layer may contain cavated filler particles. The primary filler-containing layer 15 faces away from the nonwoven web 40. The lamination of the film to the nonwoven web may be accomplished using conventional thermal bonding or adhesive bonding techniques.

The breathable stretch-thinned film and/or laminate containing it may be used in a wide variety of personal care absorbent articles and medical products. The term "personal care absorbent products" includes without limitation diapers, training pants, swim wear, absorbent underpants, baby wipes, adult incontinence products and feminine hygiene products. The term "medical products" includes without limitation medical garments, aprons, underpads, bandages, drapes and wipes.

Mocon Test Procedure For Water Vapor Transmission Rate (WVTR)

A suitable technique for determining the WVTR (water vapor transmission rate) value of a film or laminate material of the invention is the test procedure standardized by INDA (Association of the Nonwoven Fabrics Industry), number IST-70.4-99, entitled "STANDARD TEST METHOD FOR WATER VAPOR TRANSMISSION RATE THROUGH NONWOVEN AND PLASTIC FILM USING A GUARD FILM AND VAPOR PRESSURE SENSOR" which is incorporated by reference herein. The INDA procedure provides for the determination of WVTR, the permeance of the film to water vapor and, for homogeneous materials, water vapor permeability coefficient.

The INDA test method is well known and will not be set forth in detail herein. However, the test procedure is summarized as follows. A dry chamber is separated from a wet chamber of known temperature and humidity by a permanent guard film and the sample material to be tested. The purpose of the guard film is to define a definite air gap and to quiet or still the air in the air gap while the air gap is characterized. The dry chamber, guard film, and the wet chamber make up a diffusion cell in which the test film is sealed. The sample holder is known as the Permatran-W Model 100K manufactured by Mocon/Modem Controls, Inc., Minneapolis, Minn. A first test is made of the WVTR of the guard film and the air gap between an evaporator assembly that generates 100% relative humidity. Water vapor diffuses through the air gap and the guard film and then mixes with a dry gas flow which is proportional to water vapor concentration. The electrical signal is routed to a computer for processing. The computer calculates the transmission rate of the air gap and the guard film and stores the value for further use.

The transmission rate of the guard film and air gap is stored in the computer as CalC. The sample material is then sealed in the test cell. Again, water vapor diffuses through the air gap to the guard film and the test material and then mixes with a dry gas flow that sweeps the test material. Also, again, this mixture is carried to the vapor sensor. The computer then calculates the transmission rate of the combination of the air gap, the guard film, and the test material. This information is then used to calculate the transmission rate at which moisture is transmitted through the test material according to the equation:

$TR^{-1}_{test\ material} = TR^{-1}_{test\ material,\ guardfilm,\ airgap} - TR^{-1}_{guardfilm,\ airgap}$ Calculations:

WVTR: The calculation of the WVTR uses the formula:

$WVTR = Fp_{sat}(T)RH/Ap_{sat}(T)(1-RH))$ where:

F=The flow of water vapor in cc/min., $p_{sat}(T)$=The density of water in saturated air at temperature T, RH=The relative humidity at specified locations in the cell, A=The cross sectional area of the cell, and, $p_{sat}(T)$=The saturation vapor pressure of water vapor at temperature T.

Examples

Breathable stretch-thinned films were prepared from mixtures of thermoplastic polyolefin and cyclodextrin. The thermoplastic polyolefin was PL1845 polyethylene available from Dow Chemical Co., located in Midland, Mich. The cyclodextrin evaluated was alpha-cyclodextrin sold under the trade name CAVITRON® by Cerestrar Corporation, located in Hammond, Ind.

Loadings of 20%, 30% and 40% by weight cyclodextrin were employed. The cyclodextrin had a mean particle diameter of about 13.7 microns. The cyclodextrin was added in a particle form but, notably, may be added as fibers, liquid or another form. The cyclodextrin and polyolefin were mixed using a twin screw extruder, and the mixture was cast into monolayer films using a small 10" die width developmental cast film line. When the films cooled, the cyclodextrin crystallized into fine particles. The films initially had a thickness of 5–8 mils. The films were stretched, typically biaxially to about 2.25 times their initial dimensions in the machine and cross directions. The stretch-thinned films had a thickness of approximately one mil, which varied slightly for different samples.

The stretch-thinned films were tested for WVTR using the Mocon procedure described above. The results are provided in Table 1. Some of the Examples are repeats of earlier examples.

| Example No. | Line | Cyclodextrin Type | Cyclodextrin Amount (% by weight) | MD Stretch | CD Stretch | Stretch Temp, °F. | MVTR, $g/m^2$-24 hrs. |
|---|---|---|---|---|---|---|---|
| 1 | Lab. | Alpha | 20 | 2.25 | 2.25 | 190 | 3723 |
| 2 | Lab. | Alpha | 20 | 2.25 | 2.25 | 190 | 4467 |
| 3 | Lab. | Alpha | 30 | 2.25 | 2.25 | 190 | 28593 |
| 4 | Lab. | Alpha | 30 | 2.25 | 2.25 | 190 | 24720 |
| 5 | Lab. | Alpha | 40 | 2.25 | 2.25 | 190 | 66167 |
| 6 | Lab. | Alpha | 40 | 2.25 | 2.25 | 190 | 18512 |
| 7 | Lab. | Alpha | 30 | 2.25 | 0 | 190 | 214 |
| 8 | Lab. | Alpha | 30 | 2.25 | 0 | 190 | 95 |
| 9 | Lab. | Alpha | 30 | 2.25 | 0 | 190 | 120 |
| 10 | Lab. | Alpha | 20 | 2.25 | 2.25 | 190 | 4890 |
| 11 | Lab. | Alpha | 20 | 2.25 | 2.25 | 190 | 2999 |
| 12 | Lab. | Alpha | 20 | 2.25 | 2.25 | 190 | 4047 |

While the embodiments of the invention disclosed herein are presently considered preferred, various modifications and improvements can be made without departing from the spirit and scope of the invention. The scope of the invention is indicated by the appended claims, and all changes that fall within the meaning and range of equivalents are intended to be embraced therein.

We claim:

1. A breathable, stretch-thinned film comprising a mixture of cavated filler particles and a thermoplastic polymer, the film having voids formed around the cavated filler particles to facilitate the passage of water vapor through the film.

2. The breathable, stretch-thinned film of claim 1, wherein the cavated filler particles comprise molecules having a ring-like structure.

3. The breathable, stretch-thinned film of claim 1, wherein the cavated filler particles comprise molecules having a conical structure.

4. The breathable, stretch-thinned film of claim 1, wherein the cavated filler particles comprise cyclodextrin.

5. The breathable, stretch-thinned film of claim 4, wherein the cyclodextrin comprises alpha-cyclodextrin.

6. The breathable, stretch-thinned film of claim 4, wherein the cyclodextrin comprises beta-cyclodextrin.

7. The breathable, stretch-thinned film of claim 4, wherein the cyclodextrin comprises gamma-cyclodextrin.

8. The breathable, stretch-thinned film of claim 1, comprising about 5–70% by weight of the cavated filler particles.

9. The breathable, stretch-thinned film of claim 1, comprising about 5–45% by weight of the cavated filler particles.

10. The breathable, stretch-thinned film of claim 1, comprising about 20–40% by weight of the cavated filler particles.

11. The breathable, stretch-thinned film of claim 1, comprising greater than 45% to about 70% by weight of the cavated filler particles.

12. The breathable, stretch-thinned film of claim 1, comprising about 50–65% by weight of the cavated filler particles.

13. The breathable, stretch-thinned film of claim 1, having a WVTR of at least 1000 $g/m^2$-24 hours.

14. The breathable, stretch-thinned film of claim 1, having a WVTR of at least 5000 $g/m^2$-24 hours.

15. The breathable, stretch-thinned film of claim 1, having a WVTR of at least 10,000 $g/m^2$-24 hours.

16. The breathable, stretch-thinned film of claim 1, having a WVTR of at least 15,000 $g/m^2$-24 hours.

17. The breathable, stretch-thinned film of claim 1, having a WVTR of at least 20,000 $g/m^2$-24 hours.

18. The breathable, stretch-thinned film of claim 1, wherein the thermoplastic polymer is selected from polyethylene homopolymers, polyethylene copolymers, polypropylene homopolymers, polypropylene copolymers, and combinations thereof.

19. The breathable, stretch-thinned film of claim 1, wherein the thermoplastic polymer is selected from polyurethanes, polyether esters, polyamide polyether copolymers, ethylene methyl acrylate, ethylene ethyl acrylate, ethylene vinyl acetate, and combinations thereof.

20. A breathable laminate comprising a breathable, stretch-thinned film and a nonwoven web; the film including a polymer matrix and cavated filler particles dispersed within the polymer matrix, and having voids formed around the cavated filler particles to facilitate the passage of water vapor.

21. The breathable laminate of claim 20, wherein the cavated filler particles comprise molecules having a ring-like structure.

22. The breathable laminate of claim 20, wherein the cavated filler particles comprise molecules having a conical structure.

23. The breathable laminate of claim 20, wherein the cavated filler particles comprise cyclodextrin.

24. The breathable laminate of claim 20, wherein the nonwoven web comprises a spunbond web.

25. The breathable laminate of claim 20, wherein the nonwoven web comprises a meltblown web.

26. The breathable laminate of claim 20, wherein the nonwoven web comprises an air laid web.

27. The breathable laminate of claim 20, wherein the nonwoven web comprises polypropylene.

28. A breathable, stretch-thinned film comprising a mixture of a polyolefin and cyclodextrin particles, the film having voids formed around the cyclodextrin particles.

29. A breathable laminate comprising the stretch-thinned film of claim 28, and a spunbond web.

30. A personal care absorbent product comprising the film of claim 1.

31. A personal care absorbent product comprising the laminate of claim 20.

32. A medical product comprising the film of claim 1.

33. A medical product comprising the laminate of claim 20.

* * * * *

UNITED STATES PATENT AND TRADEMARK OFFICE
CERTIFICATE OF CORRECTION

PATENT NO.   : 6,569,225 B2
DATED        : May 27, 2003
INVENTOR(S)  : Charles Edward Edmundson et al.

It is certified that error appears in the above-identified patent and that said Letters Patent is hereby corrected as shown below:

Column 9,
Line 50, replace the existing equation with the following equation:
-- $WVTR = F\rho_{sat}(T)RH/Ap_{sat}(T)(1-RH)$ --
Line 53, replace "$p_{sat}(T)$" with -- $\rho_{sat}(T)$ --

Signed and Sealed this

Twelfth Day of October, 2004

JON W. DUDAS
*Director of the United States Patent and Trademark Office*